US012726887B2

(12) United States Patent
Belling et al.

(10) Patent No.: US 12,726,887 B2
(45) Date of Patent: Sep. 1, 2026

(54) METHODS, APPARATUSES AND COMPUTER PROGRAM PRODUCTS FOR IDENTIFYING AN ACCESS NETWORK NODE

(71) Applicant: Nokia Technologies Oy, Espoo (FI)

(72) Inventors: Horst Thomas Belling, Munich (DE); Bruno Landais, Lannion (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 353 days.

(21) Appl. No.: 18/264,906

(22) PCT Filed: Feb. 11, 2021

(86) PCT No.: PCT/EP2021/053293
§ 371 (c)(1),
(2) Date: Aug. 9, 2023

(87) PCT Pub. No.: WO2022/171282
PCT Pub. Date: Aug. 18, 2022

(65) Prior Publication Data

US 2024/0129837 A1 Apr. 18, 2024

(51) Int. Cl.
*H04W 8/24* (2009.01)
*H04W 36/08* (2009.01)
*H04W 48/16* (2009.01)

(52) U.S. Cl.
CPC ............ *H04W 48/16* (2013.01); *H04W 8/24* (2013.01); *H04W 36/08* (2013.01)

(58) Field of Classification Search
CPC ....... H04W 48/16; H04W 8/24; H04W 36/08; H04W 8/26; H04W 8/06; H04W 68/00; H04W 76/27; H04W 12/72; H04W 12/02; H04W 8/12; H04L 61/5084; H04L 61/5053; H04L 2101/654
See application file for complete search history.

(56) References Cited

U.S. PATENT DOCUMENTS

2020/0112850 A1* 4/2020 Lee ....................... H04W 8/205
2021/0274575 A1* 9/2021 Talebi Fard .......... H04W 76/12

(Continued)

OTHER PUBLICATIONS

ZTE, "KI#3, New Sol: RAN node information exposure in AMF", 3GPP TSG-SA/WG2 Meeting #140, S2-2004835, Retrieved from the internet: https://www.3gpp.org/ftp/tsg_sa/wg2_arch/TSGS2_140e_Electronic/Docs/S2-2004835.zip (Year: 2020).*

(Continued)

*Primary Examiner* — Moo Jeong
(74) *Attorney, Agent, or Firm* — Carter, DeLuca & Farrell LLP

(57) ABSTRACT

There is provided a network apparatus configured to receive from a core network function a request to discover at least one access network node serving a user equipment, the request comprising a first user equipment identifier for identifying the user equipment in a core network; and use the user equipment identifier to provide to the core network function a second user equipment identifier identifying the user equipment in the access network, and at least one access network node identifier identifying at least one access network node in the access network that serves the user equipment.

4 Claims, 10 Drawing Sheets

(56) References Cited

U.S. PATENT DOCUMENTS

| | | | | |
|---|---|---|---|---|
| 2021/0298112 | A1* | 9/2021 | Chen | H04W 4/02 |
| 2022/0174477 | A1* | 6/2022 | Xiong | H04W 24/02 |
| 2022/0393958 | A1* | 12/2022 | Nord | H04L 43/091 |
| 2023/0037031 | A1* | 2/2023 | Wang | H04W 8/08 |
| 2023/0328508 | A1* | 10/2023 | Zhu | H04W 8/26 370/329 |

OTHER PUBLICATIONS

Line-numbered ZTE, S2-2004835 (Year: 2020).*

Invitation to Pay Additional Fees received for corresponding Patent Cooperation Treaty Application No. PCT/EP2021/053293, dated Oct. 12, 2021, 14 pages.

"3rd Generation Partnership Project; Technical Specification Group Services and System Aspects; Procedures for the 5G System (5GS); Stage 2 (Release 16)", 3GPP TS 23.502, V16.7.1, Jan. 2021, pp. 1-603.

"3rd Generation Partnership Project; Technical Specification Group Core Network and Terminals; 5G System; Access and Mobility Management Services; Stage 3 (Release 17)", 3GPP TS 29.518, V17.0.0, Dec. 2020, pp. 1-298.

"3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.

International Search Report and Written Opinion received for corresponding Patent Cooperation Treaty Application No. PCT/EP2021/053293, dated Nov. 24, 2021, 21 pages.

"3rd Generation Partnership Project; Technical Specification Group Core Network and Terminals; Handover procedures (Release 15)", 3GPP TS 23.009, V15.0.0, Jun. 2018, pp. 1-299.

"3rd Generation Partnership Project; Technical Specification Group Core Network and Terminals; Mobile Application Part (MAP) specification (Release 15)", 3GPP TS 29.002, V15.7.0, Dec. 2020, pp. 1-1024.

* cited by examiner

METHODS, APPARATUSES AND COMPUTER PROGRAM PRODUCTS FOR IDENTIFYING AN ACCESS NETWORK NODE

RELATED APPLICATION

This application claims priority to PCT Patent Application No. PCT/EP2021/053293, filed on Feb. 11, 2021, which is incorporated herein by reference in its entirety.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided a network apparatus comprising: means for receiving from a core network function a request to discover at least one access network node serving a user equipment, the request comprising a first user equipment identifier for identifying the user equipment in a core network; and means for using the user equipment identifier to provide to the core network function a second user equipment identifier identifying the user equipment in the access network, and at least one access network node identifier identifying at least one access network node in the access network that serves the user equipment.

The network apparatus may comprise means for receiving from the core network function a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The first user equipment identifier may comprise at least one of a permanent equipment identifier and a permanent subscriber identity.

The network apparatus may comprise means for receiving an indication that there has been a change in at least one of: a connection state of the user equipment; the at least one access network node identifier for identifying at least one access network node in the access network that serves the user equipment; and the second user equipment identifier identifying the user equipment.

The network apparatus may comprise means for, after receiving said indication that there has been a change, signalling the core network function information about said change.

The network apparatus may comprise means for receiving, from the core network function, a request for the user equipment to be transitioned from an idle state to a connected state; means for, in response to the received request, sending a request to the user equipment to transition from an idle state to a connected state; and means for, in response to receiving an indication that the user equipment is in a connected mode, sending said core network function an indication that the user equipment is in a connected state.

The network apparatus may comprise: means for determining at least one access network node that will be assigned to the user equipment when the user equipment transitions to the connected state, wherein said indication that the user equipment is in a connected state comprises at least one access network node identifier identifying the at least one assigned access network node.

The at least one access network node identifier identifying the at least one access network node in the access network that serves the user equipment may be at least one of: a node identifier identifying a respective access network node; and a set identifier identifying a respective plurality of access network nodes.

According to a second aspect, there is provided a core network apparatus comprising: means for transmitting to a network apparatus a request to discover at least one access network node serving a user equipment, the request comprising a first user equipment identifier for identifying a user equipment in a core network; means for receiving from the network apparatus a second user equipment identifier identifying the user equipment in the access network, and at least one access network node identifier identifying at least one access network node in the access network that serves the user equipment; and means for using the received second user equipment identifier and the at least one access network node identifier to send a first service request for the user equipment to at least one of said identified at least one access network nodes.

The core network apparatus may comprise means for sending a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The core network apparatus may comprise means for receiving from the network apparatus a notification of a change in at least one of: a connection state of the user equipment; the at least one access network node identifier for identifying at least one access network node in the access network that serves the user equipment; and the second user equipment identifier identifying the user equipment.

The first user equipment identifier may comprise at least one of a permanent equipment identifier and a permanent subscriber identity.

The core network apparatus may comprise means for receiving an indication that the user equipment is in an idle connection state, or is not served or known by said identified at least one access network node to which the first service request is transmitted; means for determining to send a second service request to said user equipment; and means for, in response to receiving said indication and said determination, sending a request for the user equipment to transition to a connected state; means for receiving, in response to said request for the user equipment to transition, an indication that the user equipment is in a connected state and receiving a new identifier of an access network node currently serving the user equipment; and means for sending the second service request for the user equipment to the access network node identified by the new identifier.

The core network apparatus may comprise means for receiving an indication that the user equipment is not served or known by said identified at least one access network node to which the first service request is transmitted; means for determining to send a third service request to said user equipment; means for, in response to receiving said indication and said determining, sending a new request to the network apparatus to discover at least one access network node serving the user equipment; means for receiving a new identifier of an access network node currently serving the user equipment; and means for, in response to receiving the new identifier, sending the third service request for the user equipment to the access network node identified by the new identifier.

The core network apparatus may comprise means for receiving an indication that the user equipment has been handed over from a first access network node to a second access network node; means for determining to send a fourth service request to said user equipment; and means for, in response to receiving said indication and said determining, sending the fourth service request for the UE to the second access network node.

The indication that the user equipment has been handed over may comprise an identifier for the second access network node or an identifier of a set of access nodes that comprises the second access network node.

The core network apparatus may comprise means for transmitting a request to the network apparatus for an identifier of the second access network node; and means for receiving the identifier of the second access network node or said identifier of the set in response to the request for the identifier of the second access network node.

The at least one access network node identifier identifying the at least one access network node in the access network that serves the user equipment may be at least one of: a node identifier identifying a respective access network node; and a set identifier identifying a respective plurality of access network nodes.

According to a third aspect, there is provided an access network node apparatus comprising: means for receiving from a core network apparatus a service request comprising a first user equipment identifier identifying a user equipment in an access network associated with said access network node; and means for rejecting the service request when the user equipment is not known and/or is no longer serviced by the access network node.

The network access network node may comprise means for responding to the service request with an indication that the user equipment is currently being served by a different access network node, said indication identifying the different access network node.

According to a fourth aspect, there is provided an apparatus for a network apparatus comprising: at least one processor; and at least one memory comprising code that, when executed by the at least one processor, causes the network apparatus to: receive from a core network function a request to discover at least one access network node serving a user equipment, the request comprising a first user equipment identifier for identifying the user equipment in a core network; and use the user equipment identifier to provide to the core network function a second user equipment identifier identifying the user equipment in the access network, and at least one access network node identifier identifying at least one access network node in the access network that serves the user equipment.

The network apparatus may be caused to receive from the core network function a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The first user equipment identifier may comprise at least one of a permanent equipment identifier and a permanent subscriber identity.

The network apparatus may be caused to receive an indication that there has been a change in at least one of: a connection state of the user equipment; the at least one access network node identifier for identifying at least one access network node in the access network that serves the user equipment; and the second user equipment identifier identifying the user equipment.

The network apparatus may be caused to, after receiving said indication that there has been a change, signal the core network function information about said change.

The network apparatus may be caused to receive, from the core network function, a request for the user equipment to be transitioned from an idle state to a connected state; send, in response to the received request, a request to the user equipment to transition from an idle state to a connected state; and, in response to receiving an indication that the user equipment is in a connected mode, send said core network function an indication that the user equipment is in a connected state.

The network apparatus may be caused to: determine at least one access network node that will be assigned to the user equipment when the user equipment transitions to the connected state, wherein said indication that the user equipment is in a connected state comprises at least one access network node identifier identifying the at least one assigned access network node.

The at least one access network node identifier identifying the at least one access network node in the access network that serves the user equipment may be at least one of: a node identifier identifying a respective access network node; and a set identifier identifying a respective plurality of access network nodes.

According to a fifth aspect, there is provided an apparatus for a core network apparatus comprising: at least one processor; and at least one memory comprising code that, when executed by the at least one processor, causes the core network apparatus to: transmit to a network apparatus a request to discover at least one access network node serving a user equipment, the request comprising a first user equipment identifier for identifying a user equipment in a core network; receive from the network apparatus a second user equipment identifier identifying the user equipment in the access network, and at least one access network node identifier identifying at least one access network node in the access network that serves the user equipment; and use the received second user equipment identifier and the at least one access network node identifier to send a first service request for the user equipment to at least one of said identified at least one access network nodes.

The core network apparatus may be caused to send a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The core network apparatus may be caused to receive from the network apparatus a notification of a change in at least one of: a connection state of the user equipment; the at least one access network node identifier for identifying at least one access network node in the access network that serves the user equipment; and the second user equipment identifier identifying the user equipment.

The first user equipment identifier may comprise at least one of a permanent equipment identifier and a permanent subscriber identity.

The core network apparatus may be caused to receive an indication that the user equipment is in an idle connection state, or is not served or known by said identified at least one access network node to which the first service request is transmitted; determine to send a second service request to said user equipment; in response to receiving said indication and said determination, send a request for the user equipment to transition to a connected state; receive, in response to said request for the user equipment to transition, an indication that the user equipment is in a connected state and receive a new identifier of an access network node currently serving the user equipment; and send the second service request for the user equipment to the access network node identified by the new identifier.

The core network apparatus may be caused to receive an indication that the user equipment is not served or known by said identified at least one access network node to which the first service request is transmitted; determine to send a third service request to said user equipment; in response to receiving said indication and said determination, send a new request to the network apparatus to discover at least one access network node serving the user equipment; receive a new identifier of an access network node currently serving the user equipment; and, in response to receiving the new identifier, send the third service request for the user equipment to the access network node identified by the new identifier.

The core network apparatus may be caused to receive an indication that the user equipment has been handed over from a first access network node to a second access network node; determine to send a fourth service request to said user equipment; and, in response to receiving said indication and said determination, send the fourth service request for the UE to the second access network node.

The indication that the user equipment has been handed over may comprise an identifier for the second access network node or an identifier of a set of access nodes that comprises the second access network node.

The core network apparatus may be caused to transmit a request to the network apparatus for an identifier of the second access network node; and receive the identifier of the second access network node or the identifier of said set in response to the request for the identifier of the second access network node.

The at least one access network node identifier identifying the at least one access network node in the access network that serves the user equipment may be at least one of: a node identifier identifying a respective access network node; and a set identifier identifying a respective plurality of access network nodes.

According to a sixth aspect, there is provided an apparatus for an access network node apparatus, the apparatus comprising: at least one processor; and at least one memory comprising computer code that, when executed by the at least one processor, causes the access network node to: receive from a core network apparatus a service request comprising a first user equipment identifier identifying a user equipment in an access network associated with said access network node; and reject the service request when the user equipment is not known and/or is no longer serviced by the access network node.

The access network node may be caused to respond to the service request with an indication that the user equipment is currently being served by a different access network node, said indication identifying the different access network node.

According to a seventh aspect, there is provided a method for a network apparatus, the method comprising: receiving from a core network function a request to discover at least one access network node serving a user equipment, the request comprising a first user equipment identifier for identifying the user equipment in a core network; and using the user equipment identifier to provide to the core network function a second user equipment identifier identifying the user equipment in the access network, and at least one access network node identifier identifying at least one access network node in the access network that serves the user equipment.

The method may comprise receiving from the core network function a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The first user equipment identifier may comprise at least one of a permanent equipment identifier and a permanent subscriber identity.

The method may comprise receiving an indication that there has been a change in at least one of: a connection state of the user equipment; the at least one access network node identifier for identifying at least one access network node in the access network that serves the user equipment; and the second user equipment identifier identifying the user equipment.

The method may comprise, after receiving said indication that there has been a change, signalling the core network function information about said change.

The method may comprise receiving, from the core network function, a request for the user equipment to be transitioned from an idle state to a connected state; sending, in response to the received request, a request to the user equipment to transition from an idle state to a connected state; and, in response to receiving an indication that the user equipment is in a connected mode, sending said core network function an indication that the user equipment is in a connected state.

The method may comprise: determining at least one access network node that will be assigned to the user equipment when the user equipment transitions to the connected state, wherein said indication that the user equipment is in a connected state comprises at least one access network node identifier identifying the at least one assigned access network node.

The at least one access network node identifier identifying the at least one access network node in the access network that serves the user equipment may be at least one of: a node identifier identifying a respective access network node; and a set identifier identifying a respective plurality of access network nodes.

According to an eighth aspect, there is provided a method for a core network apparatus, the method comprising: transmitting to a network apparatus a request to discover at least one access network node serving a user equipment, the request comprising a first user equipment identifier for identifying a user equipment in a core network; receiving from the network apparatus a second user equipment identifier identifying the user equipment in the access network, and at least one access network node identifier identifying at least one access network node in the access network that serves the user equipment; and using the received second user equipment identifier and the at least one access network node identifier to send a first service request for the user equipment to at least one of said identified at least one access network nodes.

The method may comprise sending a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The method may comprise receiving from the network apparatus a notification of a change in at least one of: a connection state of the user equipment; the at least one access network node identifier for identifying at least one access network node in the access network that serves the user equipment; and the second user equipment identifier identifying the user equipment.

The first user equipment identifier may comprise at least one of a permanent equipment identifier and a permanent subscriber identity.

The method may comprise receiving an indication that the user equipment is in an idle connection state, or is not served or known by said identified at least one access network node to which the first service request is transmitted; determining to send a second service request to said user equipment; in response to receiving said indication and said determining, sending a request for the user equipment to transition to a connected state; receiving, in response to said request for the user equipment to transition, an indication that the user equipment is in a connected state and receiving a new identifier of an access network node currently serving the user equipment; and sending the second service request for the user equipment to the access network node identified by the new identifier.

The method may comprise receiving an indication that the user equipment is not served or known by said identified at least one access network node to which the first service request is transmitted; determining to send a third service request to said user equipment; in response to receiving said indication and said determination, sending a new request to the network apparatus to discover at least one access network node serving the user equipment; receiving a new identifier of an access network node currently serving the user equipment; and, in response to receiving the new identifier, sending the third service request for the user equipment to the access network node identified by the new identifier.

The method may comprise receiving an indication that the user equipment has been handed over from a first access network node to a second access network node; determining to send a fourth service request to said user equipment; and, in response to receiving said indication and said determination, sending the fourth service request for the UE to the second access network node.

The indication that the user equipment has been handed over may comprise an identifier for the second access network node or an identifier of a set of access nodes that comprises the second access network node.

The method may comprise transmitting a request to the network apparatus for an identifier of the second access network node; and receiving the identifier of the second access network node or the identifier of said set in response to the request for the identifier of the second access network node.

The at least one access network node identifier identifying the at least one access network node in the access network that serves the user equipment may be at least one of: a node identifier identifying a respective access network node; and a set identifier identifying a respective plurality of access network nodes.

According to a ninth aspect, there is provided a method for an access network node apparatus, the method comprising: receiving from a core network apparatus a service request comprising a first user equipment identifier identifying a user equipment in an access network associated with said access network node; and rejecting the service request when the user equipment is not known and/or is no longer serviced by the access network node.

The method may comprise responding to the service request with an indication that the user equipment is currently being served by a different access network node, said indication identifying the different access network node.

According to a tenth aspect, there is provided a network apparatus comprising: receiving circuitry for receiving from a core network function a request to discover at least one access network node serving a user equipment, the request comprising a first user equipment identifier for identifying the user equipment in a core network; and using circuitry for using the user equipment identifier to provide to the core network function a second user equipment identifier identifying the user equipment in the access network, and at least one access network node identifier identifying at least one access network node in the access network that serves the user equipment.

The network apparatus may comprise receiving circuitry for receiving from the core network function a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The first user equipment identifier may comprise at least one of a permanent equipment identifier and a permanent subscriber identity.

The network apparatus may comprise receiving circuitry for receiving an indication that there has been a change in at least one of: a connection state of the user equipment; the at least one access network node identifier for identifying at least one access network node in the access network that serves the user equipment; and the second user equipment identifier identifying the user equipment.

The network apparatus may comprise receiving circuitry for, after receiving said indication that there has been a change, signalling the core network function information about said change.

The network apparatus may comprise receiving circuitry for receiving, from the core network function, a request for the user equipment to be transitioned from an idle state to a connected state; sending circuitry for, in response to the received request, sending a request to the user equipment to transition from an idle state to a connected state; and receiving circuitry for, in response to receiving an indication that the user equipment is in a connected mode, sending said core network function an indication that the user equipment is in a connected state.

The network apparatus may comprise: determining circuitry for determining at least one access network node that will be assigned to the user equipment when the user equipment transitions to the connected state, wherein said indication that the user equipment is in a connected state comprises at least one access network node identifier identifying the at least one assigned access network node.

The at least one access network node identifier identifying the at least one access network node in the access network that serves the user equipment may be at least one of: a node identifier identifying a respective access network node; and a set identifier identifying a respective plurality of access network nodes.

According to an eleventh aspect, there is provided a core network apparatus comprising: transmitting circuitry for transmitting to a network apparatus a request to discover at least one access network node serving a user equipment, the request comprising a first user equipment identifier for identifying a user equipment in a core network; receiving circuitry for receiving from the network apparatus a second user equipment identifier identifying the user equipment in the access network, and at least one access network node identifier identifying at least one access network node in the access network that serves the user equipment; and using circuitry for using the received second user equipment identifier and the at least one access network node identifier to send a first service request for the user equipment to at least one of said identified at least one access network nodes.

The core network apparatus may comprise sending circuitry for sending a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The core network apparatus may comprise receiving circuitry for receiving from the network apparatus a notification of a change in at least one of: a connection state of the user equipment; the at least one access network node identifier for identifying at least one access network node in the access network that serves the user equipment; and the second user equipment identifier identifying the user equipment.

The first user equipment identifier may comprise at least one of a permanent equipment identifier and a permanent subscriber identity.

The core network apparatus may comprise receiving circuitry for receiving an indication that the user equipment is in an idle connection state, or is not served or known by said identified at least one access network node to which the first service request is transmitted; determining circuitry for determining to send a second service request to said user equipment; sending circuitry for, in response to receiving said indication and said determination, sending a request for the user equipment to transition to a connected state; receiving circuitry for receiving, in response to said request for the user equipment to transition, an indication that the user equipment is in a connected state and receiving a new identifier of an access network node currently serving the user equipment; and sending circuitry for sending the second service request for the user equipment to the access network node identified by the new identifier.

The core network apparatus may comprise receiving circuitry for receiving an indication that the user equipment is not served or known by said identified at least one access network node to which the first service request is transmitted; determining circuitry for determining to send a third service request to said user equipment; sending circuitry for, in response to receiving said indication and said determination, sending a new request to the network apparatus to discover at least one access network node serving the user equipment; receiving circuitry for receiving a new identifier of an access network node currently serving the user equipment; and sending circuitry for, in response to receiving the new identifier, sending the third service request for the user equipment to the access network node identified by the new identifier.

The core network apparatus may comprise receiving circuitry for receiving an indication that the user equipment has been handed over from a first access network node to a second access network node; determining circuitry for determining to send a fourth service request to said user equipment; and sending circuitry for, in response to receiving said indication and said determination, sending the fourth service request for the UE to the second access network node.

The indication that the user equipment has been handed over may comprise an identifier for the second access network node or an identifier of a set of access nodes that comprises the second access network node.

The core network apparatus may comprise transmitting circuitry for transmitting a request to the network apparatus for an identifier of the second access network node; and receiving circuitry for receiving the identifier of the second access network node or the identifier of said set in response to the request for the identifier of the second access network node.

The at least one access network node identifier identifying the at least one access network node in the access network that serves the user equipment may be at least one of: a node identifier identifying a respective access network node; and a set identifier identifying a respective plurality of access network nodes.

According to a twelfth aspect, there is provided an access network node apparatus comprising: receiving circuitry for receiving from a core network apparatus a service request comprising a first user equipment identifier identifying a user equipment in an access network associated with said access network node; and rejecting circuitry for rejecting the service request when the user equipment is not known and/or is no longer serviced by the access network node.

The access network node may comprise responding circuitry for responding to the service request with an indication that the user equipment is currently being served by a different access network node, said indication identifying the different access network node.

According to a thirteenth aspect, there is provided an apparatus for a network apparatus comprising: at least one processor; and at least one memory comprising code that, when executed by the at least one processor, causes the network apparatus to: receive from a core network function a request to discover at least one access network node serving a user equipment, the request comprising a first user equipment identifier for identifying the user equipment in a core network; and use the user equipment identifier to provide to the core network function a second user equipment identifier identifying the user equipment in the access network, and at least one access network node identifier identifying at least one access network node in the access network that serves the user equipment.

The network apparatus may be caused to receive from the core network function a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The first user equipment identifier may comprise at least one of a permanent equipment identifier and a permanent subscriber identity.

The network apparatus may be caused to receive an indication that there has been a change in at least one of: a connection state of the user equipment; the at least one access network node identifier for identifying at least one access network node in the access network that serves the user equipment; and the second user equipment identifier identifying the user equipment.

The network apparatus may be caused to, after receiving said indication that there has been a change, signal the core network function information about said change.

The network apparatus may be caused to receive, from the core network function, a request for the user equipment to be transitioned from an idle state to a connected state; send, in response to the received request, a request to the user equipment to transition from an idle state to a connected state; and, in response to receiving an indication that the user equipment is in a connected mode, send said core network function an indication that the user equipment is in a connected state.

The network apparatus may be caused to: determine at least one access network node that will be assigned to the user equipment when the user equipment transitions to the connected state, wherein said indication that the user equipment is in a connected state comprises at least one access network node identifier identifying the at least one assigned access network node.

The at least one access network node identifier identifying the at least one access network node in the access network that serves the user equipment may be at least one of: a node identifier identifying a respective access network node; and a set identifier identifying a respective plurality of access network nodes.

According to a fourteenth aspect, there is provided an apparatus for a core network apparatus comprising: at least one processor; and at least one memory comprising code that, when executed by the at least one processor, causes the core network apparatus to: transmit to a network apparatus a request to discover at least one access network node serving a user equipment, the request comprising a first user equipment identifier for identifying a user equipment in a core network; receive from the network apparatus a second user equipment identifier identifying the user equipment in the access network, and at least one access network node identifier identifying at least one access network node in the access network that serves the user equipment; and use the received second user equipment identifier and the at least one access network node identifier to send a first service request for the user equipment to at least one of said identified at least one access network nodes.

The core network apparatus may be caused to send a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The core network apparatus may be caused to receive from the network apparatus a notification of a change in at least one of: a connection state of the user equipment; the at least one access network node identifier for identifying at least one access network node in the access network that serves the user equipment; and the second user equipment identifier identifying the user equipment.

The first user equipment identifier may comprise at least one of a permanent equipment identifier and a permanent subscriber identity.

The core network apparatus may be caused to receive an indication that the user equipment is in an idle connection state, or is not served or known by said identified at least one access network node to which the first service request is transmitted; determine to send a second service request to said user equipment; in response to receiving said indication and said determining, send a request for the user equipment to transition to a connected state; receive, in response to said request for the user equipment to transition, an indication that the user equipment is in a connected state and receive a new identifier of an access network node currently serving the user equipment; and send the second service request for the user equipment to the access network node identified by the new identifier.

The core network apparatus may be caused to receive an indication that the user equipment is not served or known by said identified at least one access network node to which the first service request is transmitted; determine to send a third service request to said user equipment; in response to receiving said indication and said determination, send a new request to the network apparatus to discover at least one access network node serving the user equipment; receive a new identifier of an access network node currently serving the user equipment; and, in response to receiving the new identifier, send the third service request for the user equipment to the access network node identified by the new identifier.

The core network apparatus may be caused to receive an indication that the user equipment has been handed over from a first access network node to a second access network node; determine to send a fourth service request to said user equipment; and, in response to receiving said indication, send the fourth service request for the UE to the second access network node.

The indication that the user equipment has been handed over may comprise an identifier for the second access network node or an identifier of a set of access nodes that comprises the second access network node.

The core network apparatus may be caused to transmit a request to the network apparatus for an identifier of the second access network node; and receive the identifier of the second access network node or the identifier of said set in response to the request for the identifier of the second access network node.

The at least one access network node identifier identifying the at least one access network node in the access network that serves the user equipment may be at least one of: a node identifier identifying a respective access network node; and a set identifier identifying a respective plurality of access network nodes.

According to a fifteenth aspect, there is provided an apparatus for an access network node apparatus, the apparatus comprising: at least one processor; and at least one memory comprising computer code that, when executed by the at least one processor, causes the access network node to: receive from a core network apparatus a service request comprising a first user equipment identifier identifying a user equipment in an access network associated with said access network node; and reject the service request when the user equipment is not known and/or is no longer serviced by the access network node.

The access network node may be caused to respond to the service request with an indication that the user equipment is currently being served by a different access network node, said indication identifying the different access network node.

According to a sixteenth aspect, there is provided a computer program comprising program instructions for causing a computer to perform any method as described above.

According to a seventeenth aspect, there is provided a computer program product stored on a medium that may cause an apparatus to perform any method as described herein.

According to an eighteenth aspect, there is provided an electronic device that may comprise apparatus as described herein.

According to a nineteenth aspect, there is provided a chipset that may comprise an apparatus as described herein.

BRIEF DESCRIPTION OF FIGURES

Examples will now be described, by way of example only, with reference to the accompanying Figures in which.

DETAILED DESCRIPTION

In the following, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems with analogous components (for example, current 6G proposals).

Before explaining in detail the exemplifying embodiments, certain general principles of a 5G wireless communication system are briefly explained with reference to FIG. 1.

Figure 1:
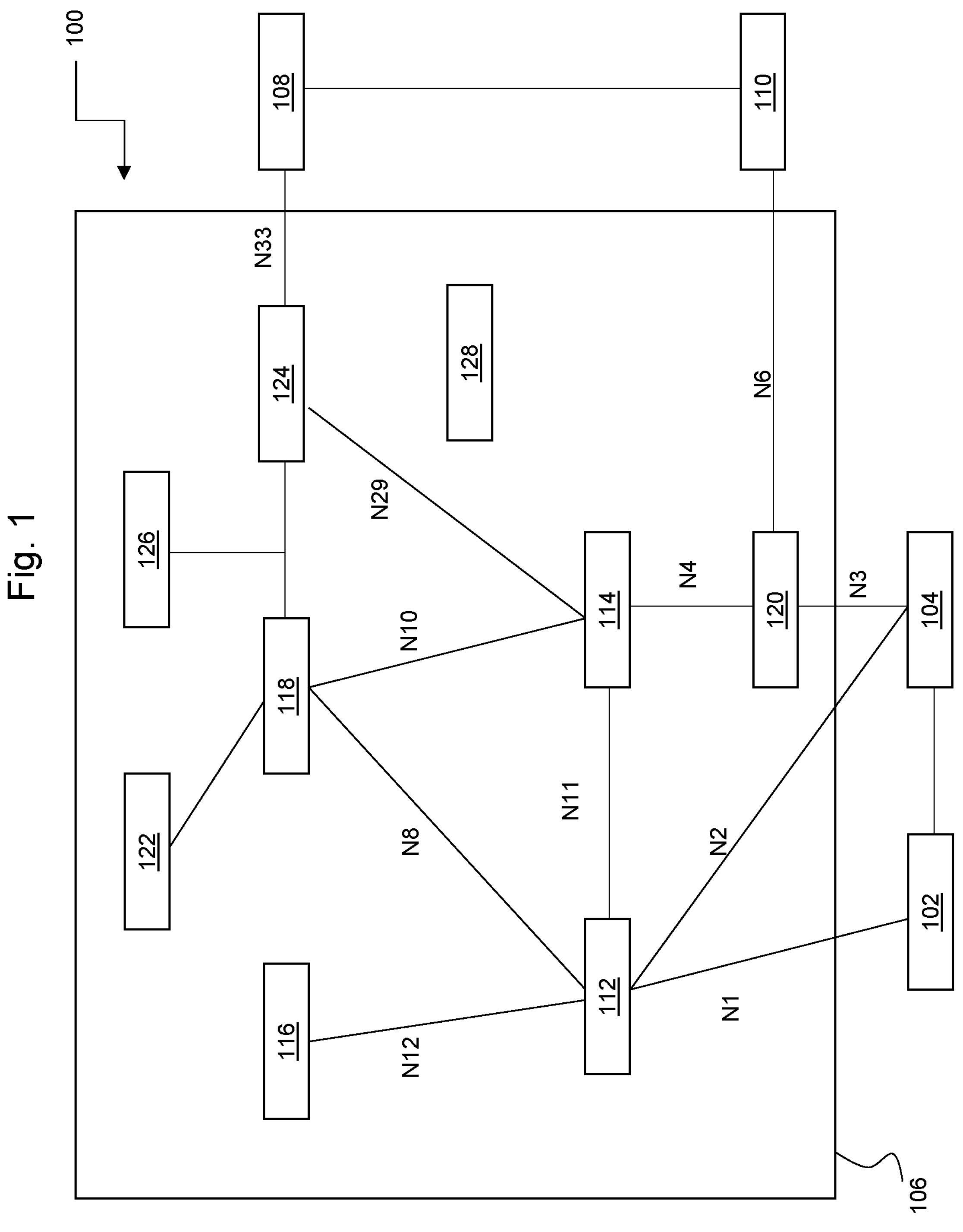
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5GC (5G Core) network has been defined as a Service Based Architecture (SBA). Service-Based Architectures provide a modular framework from which common applications can be deployed using components of varying sources and suppliers. Control plane functionality and common data repositories of a 5G network may thus be delivered by way of a set of interconnected Network Functions (NFs), each with authorization to access each other's services, with Network Function (NF) service producers exposing services to NF service consumers. NFs may act as service consumers and/or service providers. NF service providers register their NF profile in a Network Repository Function (NRF). An NRF maintains an updated repository of 5G elements available in the operator's network, along with the services provided by each of the elements in the 5G core that are expected to be instantiated, scaled and/or terminated without or minimal manual intervention. In other words, the NRF maintains a record of available NF instances and their supported services. The NRF allows other NF instances to subscribe and be notified of registrations from NF instances of a given type. The NRF may support service discovery, by receipt of Discovery Requests from NF instances and details which NF instances support specific services. Therefore NF Service consumers or Service Communication Proxies (SCP) (which obtain NF services on behalf of another network entity) may discover NF service producers by performing for example, an NF Discovery procedure towards the NRF.

Figure 5A:
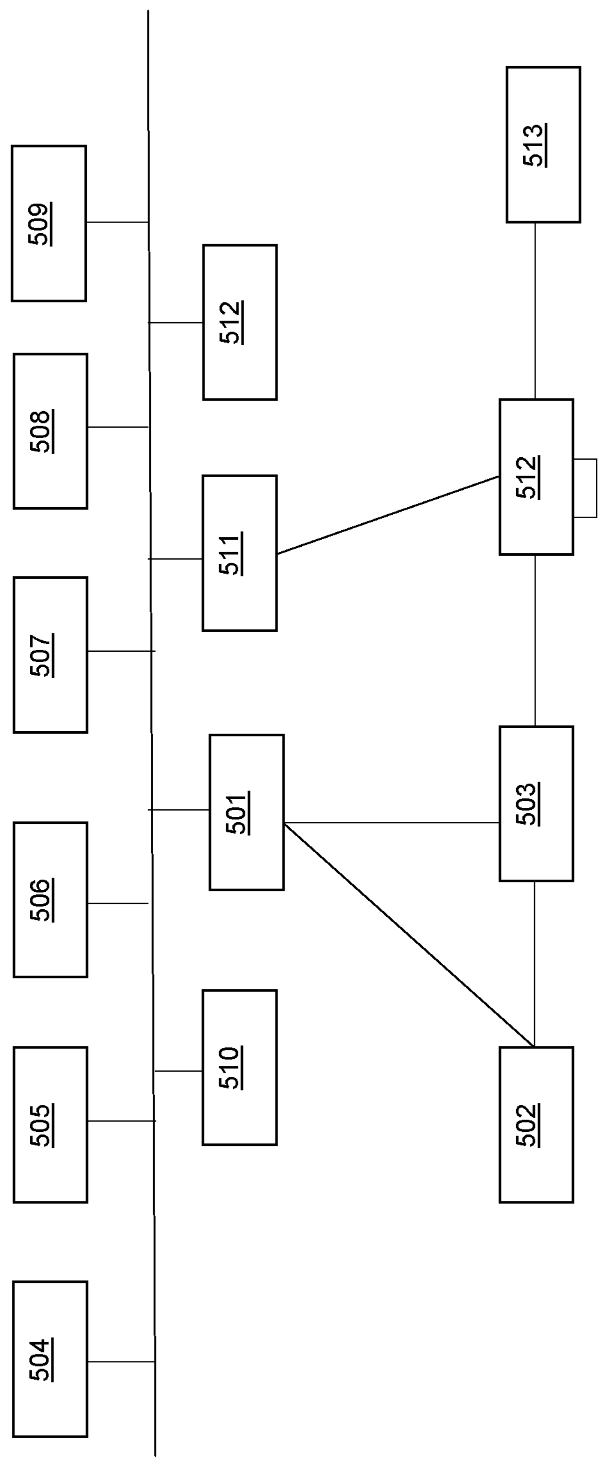
FIGS. 5A and 5B illustrate some of the interfaces and connections across the 5G Core network and an access network.
Figure 5B:
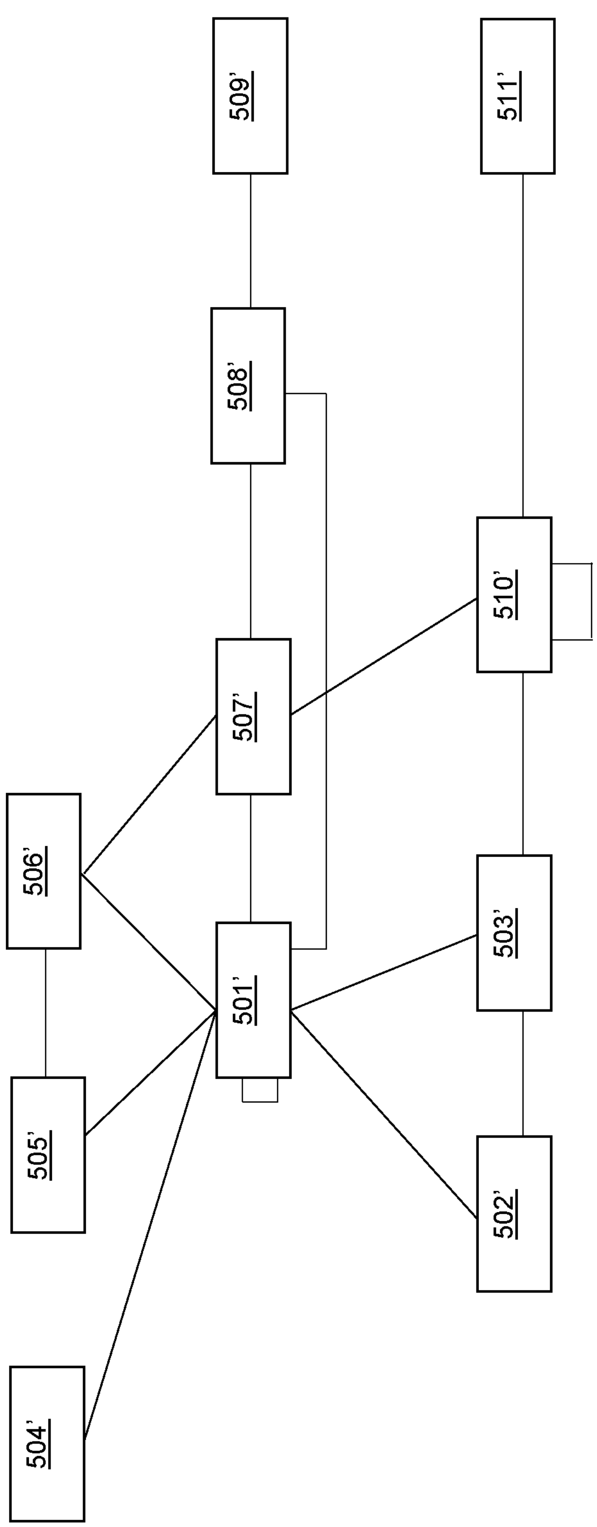

FIGS. 5A and 5B illustrate some of the interfaces and elements that may be present in a 5G system.

FIG. 5A illustrates an AMF 501 connected to a user equipment 502 via an N1 interface, and connected to an access network 503 (such as a RAN) via an N2 interface. The user equipment 502 and the access network 503 may communicate with each other over a separate interface. The AMF 501 may provide services to other elements in the 5GC via an Namf interface. Elements in the 5GC may include a Network Slice Selection Function (NSSF) 504, a Network Exposure Function (NEF) 505, a Network Repository Function (NRF) 506, a Policy Control Function (PCF) 507, a Unified Data Management Function (UDM) 508, an Application Function (AF) 509, an Authentication Server Function (AUSF) 510, a Session Management Function (SMF) 511, and a Service Communication Proxy (SCP) 512. The service based interfaces for these core network functions are respectively labelled Nnssf, Nnef, Nnrf, Npcf, Nudm, Naf, Nausf and Nsmf in 5GC specifications.

SMF 511 is connected to a User Plane Function (UPF) 512 via an N4 interface. The UPF 512 is connected to the access network 503 via an N3 interface, to other UPF via an N9 interface, and to a data network via an N6 interface.

Relative to FIG. 5A, FIG. 5B provides more information on interfaces that may exist in the 5GC.

FIG. 5B illustrates an AMF 501' connected to a user equipment 502' via an N1 interface, and connected to an access network 503' (such as a RAN) via an N2 interface. The user equipment 502' and the access network 503' may communicate with each other over a separate interface. The AMF 501' may be connected to elements in the 5GC. For example, the AMF 501' is shown as being connected to an NSSF 504' via an N22 interface, to an AUSF 505' via an N12 interface, to a UDM 506' via an N8 interface, to an SMF 507' via an N11 interface, and to a PCF 508' via an N15 interface. The AMF 501' may also communicate with another AMF using an N14 interface.

FIG. 5B further shows the AUSF 505' interfacing with the UDM 506' via an N13 interface, while the UDM 506' interfaces with the SMF 507' via an N10 interface. The SMF 507' interfaces with the PCF 508' via an N7 interface, while the PCF 508' uses an N5 interface to interface with an AF 509'.

Similar to FIG. 5A, FIG. 5B shows the SMF 507' interfacing with a UPF 510' via an N4 interface. The UPF 510' may interface with the access network 503' via an N3 interface, with another UPF via an N9 interface, and with a data network 511' via an N6 interface.

5G Core Network (5GC) has been developed as a service-based architecture and may facilitate the provision of services with wildly different data rates (e.g. from low data Internet-of-Things services to high bitrate multimedia services). As specified in 3GPP Technical Specification 23.501, the Access and Mobility Function (AMF) is located between the 5G core (5GC) and the Radio Access Network (RAN). All communication between the Radio Access Network and the 5G core traverses the AMF. As part of the 5G architecture, the AMF exhibits granular service-based interfaces towards the 5GC (e.g. HTTP-based interfaces), and can also use services offered by other core network functions. However, the AMF may also use non-service-based interfaces towards the RAN.

As all communication between the RAN and the 5GC traverses the AMF, the AMF shields the mobility of the UE and related handovers between RAN nodes from the 5GC. For security reasons, the AMF also hides, from Radio Access network nodes the permanent subscriber identifier used in the 5GC network for identifying a UE subscriber. Instead, the AMF assigns a temporary and changeable identifier for the purpose of identifying a UE context when communicating with RAN nodes. In current 5G specifications, this identifier is labelled as "AMF UE NGAP ID". The permanent subscriber identifier used in the 5G core network is labelled as "SUPI". A permanent equipment identifier (PEI) may be used to identify a UE between 5GC network functions. References throughout the following to SUPI is understood to refer to any permanent identifier used to identify a user and/or a user equipment in a core network, and so includes PEIs. Examples of permanent subscriber identifiers that can be used in a 5G core network include the International Mobile Subscriber Identity (IMSI) and the NAI (Network Access Identifier) e.g. an External Network Identifier.

The AMF also sets up or releases associations with RAN nodes over the N2 interface when the UE transitions from an IDLE state (e.g. CM_IDLE) to a CONNECTED state (e.g. CM_CONNECTED), and vice versa. This is also shielded from other 5GC network functions.

The present application discloses that it may be desirable to introduce the benefits of a service-based architecture within the RAN and between the RAN and the core network. This may allow the AMF to act as a mere forwarding node for messages from core nodes such as the SMF destined for RAN nodes (gNBs), which may increase the throughput of communications between the 5GC and the RAN. As a specific example of then this may be useful, 3GPP TS 23.502 defines a "Namf_Communication_N1N2MessageTransfer" service operation, which is designed for enabling a core network network function request to transfer downlink N2 message to the access network through the AMF.

The following thus aims to provide a mechanism for enabling 5GC network functions to directly access services that might be offered by RAN nodes.

To this effect, a new access network node discovery service operation is introduced. This service operation can be offered by a network node connected to core network nodes and having access or storing information about access network nodes serving a particular UE. The network node may be, for example, an AMF or a database attached to an AMF.

The network node connected to core network nodes/functions may receive a permanent subscriber identifier or permanent user equipment identifier (e.g. SUPI, or Permanent Equipment Identifier (PEI)) as an input from a core network node/function for identifying a subscriber/UE (these terms are used interchangeably throughout the following). This input may be used to determine at least one access network node (e.g. gNB) currently serving the UE/subscriber. An identifier for the at least one access node may be provided to the core network node/function, along with a temporary identifier for that UE/subscriber for use in the access network. This temporary UE identity may be labelled as AMF UE NGAP ID. This temporary UE identity may be assigned by said network node connected to core network nodes/functions. In 5G, therefore, this temporary UE identity for a UE may be assigned by an AMF storing a context for that UE.

As another example, this input may also be used to determine a current connection state for the UE (e.g. IDLE, CONNECTED), with that connection state being provided to the core network node/function. When the UE is in a CONNECTED state (e.g. CM_CONNECTED), the gNB/access network node serving that UE may have an associated N2 interface with the AMF for communications relating to the UE. When the UE is in an IDLE state (e.g. CM_IDLE), the gNB/access network node serving that UE may not have an associated N2 interface with the AMF for communications relating to the UE.

When the UE is determined to be in a CONNECTED state, the core network node/function may provide a service to the UE.

When the UE is determined to be in an IDLE state, this determination may cause a triggering of the access network node discovery service to page the UE to wake the UE up and/or to receive updated service information. This triggering may be performed by the core network node/function. This triggering may be performed by said network node connected to core network nodes/functions.

To help account for this process, currently defined protocols/mechanisms for paging a UE may be extended. For example, the existing Namf_MT_EnableUEReachability service operation (see 3GPP TS 29.518) currently used for paging a UE may be extended. This may be performed by adjusting an output for success to also include an address for a serving access network node (e.g. a gNB), and/or a set identifier that identifies a set of access network functions including the serving access network node if available. The temporary access network UE identity (e.g. AMF UE NGAP ID) may also be included in the information.

These parameters (i.e. the identifiers and the UE connection state) may be provided to the core network node/function in response to receipt by network node connected to core network nodes/functions of the access node discovery request. The request for these parameters may be signaled via an information element in the access node discovery request.

The AMF may also offer a subscription to notifications about Access network node change and/Temporary access network UE identity changes) and related notifications. This may be achieved, for example, by enhancing existing AMF event exposure services with corresponding events and parameters, or as part of the access network node discovery service.

As an extension to this, instead of (or in addition to) being performed by a discovery request, the parameters (i.e. the identifiers and the UE connection state) may be requested in combination with a request for a subscription to be notified of changes in the network. For example, this access node discovery service operation may be combined with a subscription request for access network node change, and/or a subscription request for Temporary access network UE identity changes, and/or a subscription for UE connection state changes. Alternatively, the subscription request(s) may be sent separately to the discovery request. Those events and a notification target may then become optional input parameters. The connection state change event may also be caused after the AMF tries to connect with the UE (e.g. due to access network node discovery service operation or the after a service operation to page/reach the UE (e.g. Namf_MT_EnableUEReachability service operation in current specifications)).

To handle mobility cases and cases where the N2 connection (i.e. a connection between the AMF and the gNB/access network node) is lost, the access network node may provide the AMF with an appropriate error indication. For example, the error indication may indicate that the temporary access network UE identity is unknown to the access network node. As another example, the error indication may indicate that the UE is IDLE. In a variant the old access network node may cache the Temporary access network UE identity for a transition period after the UE has become IDLE to provide this error response. As another example, the error indication may indicate that the UE may be handed over. In a variant the old access network node may cache for the Temporary access network UE identity and the ID/set/address of the new access network node for a transition period, and may provide this information as part of the error response. These are illustrated in the example signaling diagrams of FIGS. 6 to 8.

Figure 6:
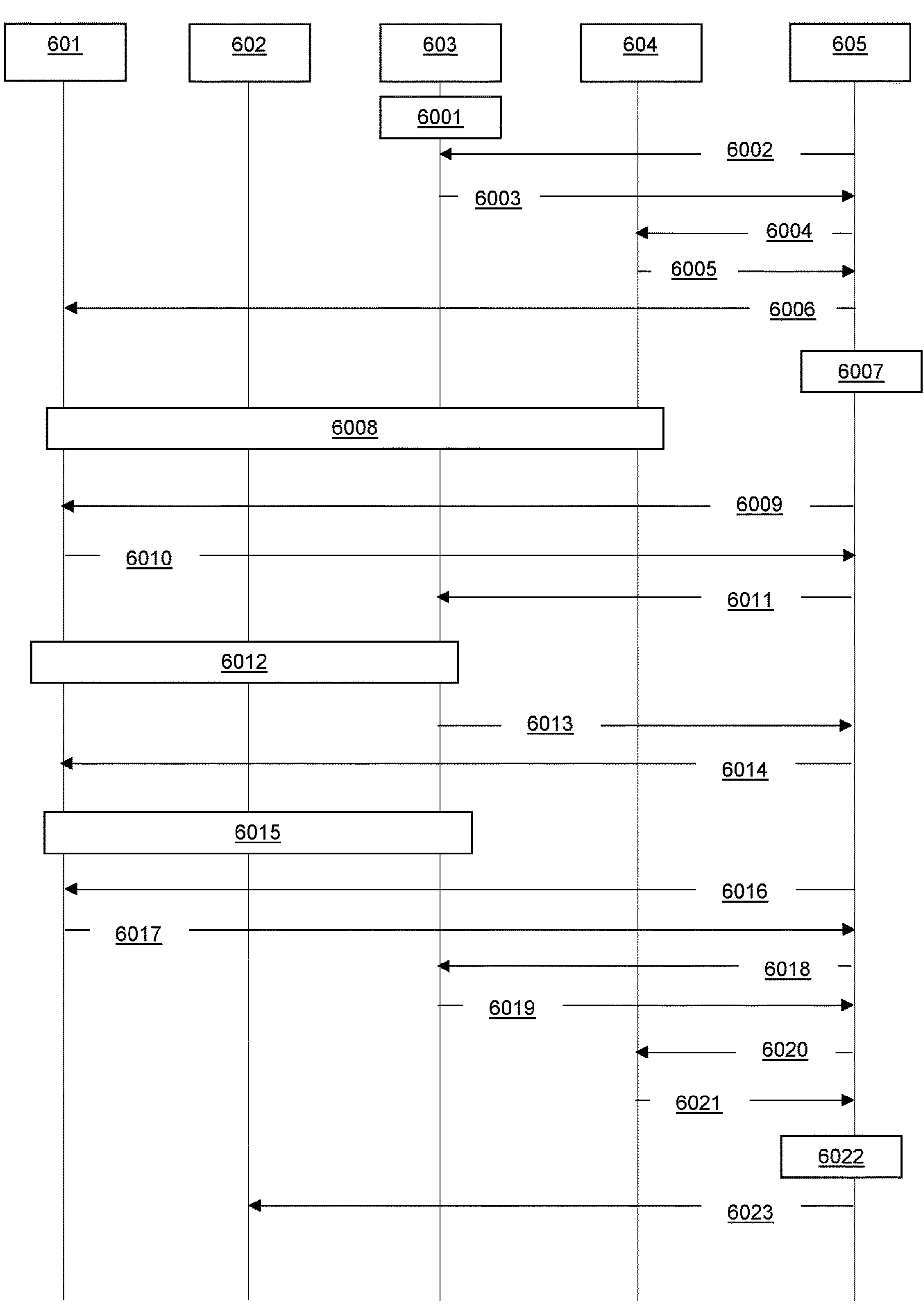
FIGS. 6 to 8 are signalling diagrams illustrating potential call flows.
Figure 7:
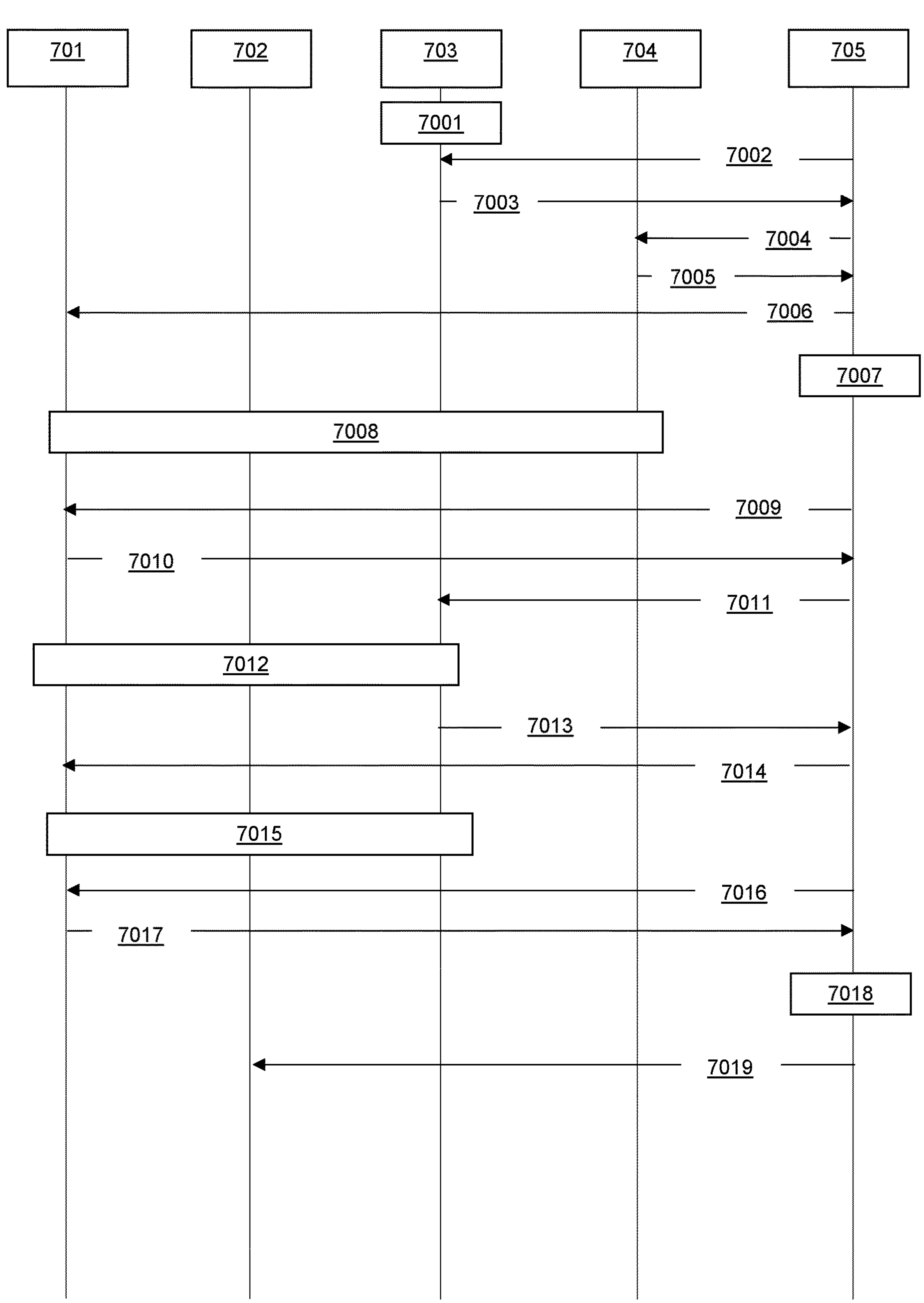
Figure 8:
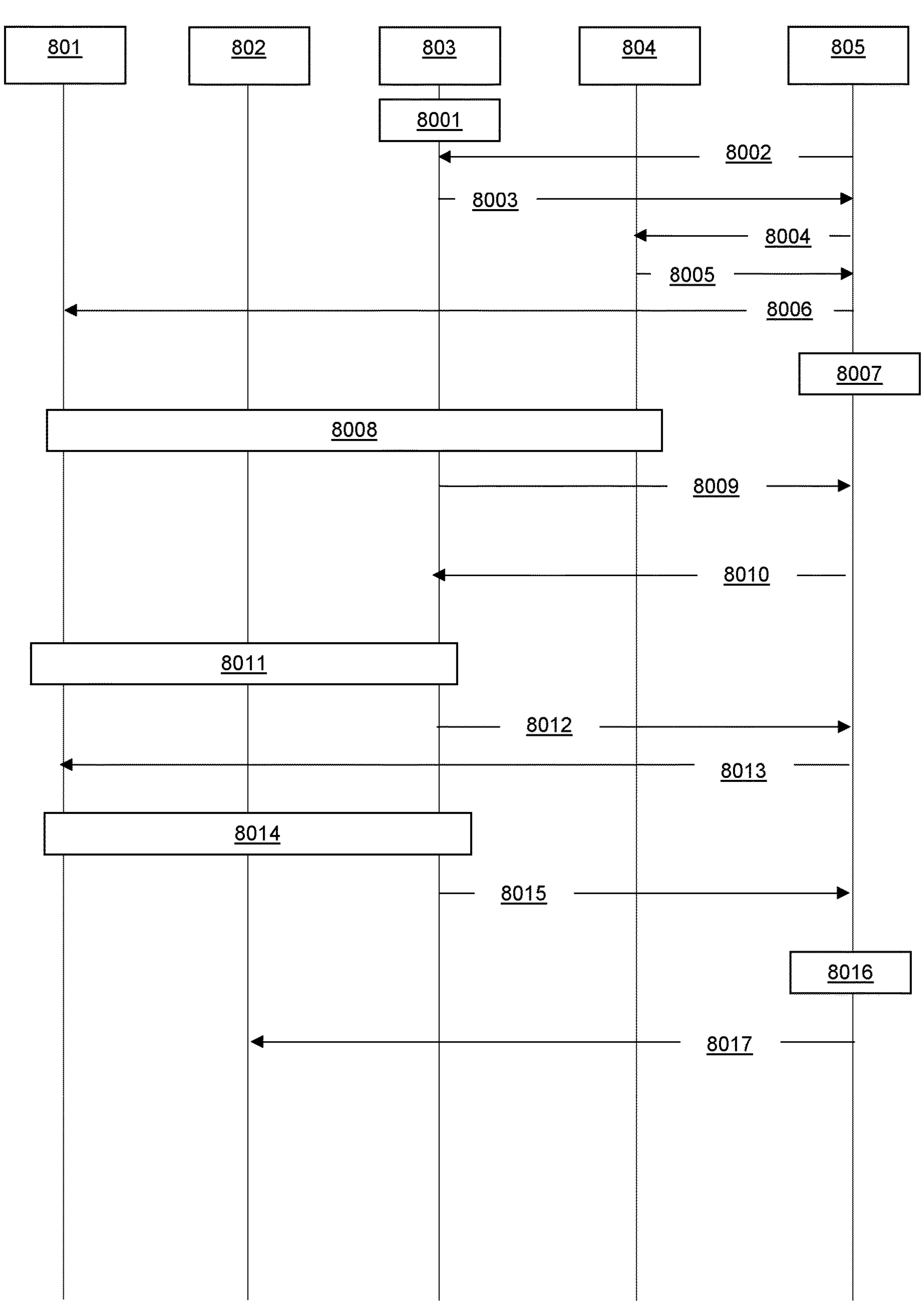

FIGS. 6 to 8 illustrate example call flows that may be made using principles described herein. These different example call flows illustrate different use cases, with the UE in a CONNECTED state, in an IDLE state, or engaged in a handover between different access network nodes.

In the example of FIG. 6, an example call flow involving first access network node 601, second access network node 602, AMF 603, NRF 604 and a 5GC network function 605 is illustrated. In the following example call flow, the UE is assumed to be in CONNECTED state and served by first access network node 601 at the start of the call flow.

At 6001, the AMF 603 has a UE context stored. By this, it is meant that the AMF 603 has access to a memory that stores the UE context. The UE context is created when the UE registers with an AMF, and may include a temporary identifier assigned by the AMF 603 to identify the UE in the first access network node when there is an N2 association established between the first access network node and the AMF for the UE. The temporary identifier may be a globally unique temporary identifier. The temporary identifier may correspond to a UE NGAP ID.

At 6002, the 5GC network function 605 sends a discovery message to the AMF 603. The discovery message may comprise a permanent subscriber identifier for a user/user equipment used by the 5GC. The identifier may be a SUPI/PEI.

At 6003, the AMF 603 responds to the discovery message by sending a discovery response to the 5GC network function. The discovery response may comprise a temporary identifier for the user/user equipment. This temporary UE identifier may be as described above. The temporary identifier may be set by the first access network node. The discovery response may comprise at least one of: an indication that the UE is in a CONNECTED state, an identifier of the first access network node, an identifier of the set of access network functions including first access network node, and a temporary identifier of the UE in the first access network node.

At 6004, the 5GC network function 605 sends a network function discovery request to the NRF 604. This discovery request may comprise the identifier of the first access network node, and/or the identifier of the set of access network functions including the first access network node.

At 6005, the NRF 604 responds to the discovery request of 6004 with a discovery response. This discovery response may comprise profile information for first access network node. This discovery response may comprise profile information for at least one other access network node. In other words, the discovery response may comprise profile information for a set of access network nodes, where the number of access network nodes in the set may be one or more than one. The profile information for a access network node may comprise at least an identifier for addressing said access network node.

At 6006, the 5GC network function 605 sends a service request to first access network node 601, requesting a service. The service request may comprise the temporary identifier of the UE in the first access network node.

At 6007, the 5GC network function 606 caches the temporary identifier and the profile information for at least one of the set of access network nodes. This combination of identifiers may be cached with the permanent subscriber identifier for the user/UE (such as SUPT/PEI).

At 6008, the UE enters an IDLE state, and the N2 association/interface between the access network node (first access network node 601) and the AMF 603 is released.

At 6009, the 5GC network function 605 sends a service request to first access network node 601, requesting a service. The service request may comprise the temporary identifier.

At 6010, the first access network node 601 responds to the service request of 6009 with an error message. This is because the N2 association has been released.

At 6011, the 5GC network function 605 sends an access node discovery request to the AMF 603. The access node discovery request may comprise the permanent subscriber identifier (e.g. SUPI/PEI), and a request for the UE to be paged.

At 6012, the UE is paged, and the UE enters a CONNECTED state. An N2 association between the AMF 603 and an access node is established. In this example, it is assumed that the UE is still served by the first access network node 601.

At 6013, the AMF 603 responds to the discovery request of 6011. This response may comprise an identifier of the first access network node, an identifier of the set of access network functions including the first access network node 601, an indication that the UE is now in a CONNECTED state, and the temporary identifier of the UE in the first access network node.

At 6014, the 5GC network function 605 sends a service request to the first access network node 601. The service request may comprise the temporary identifier contained in the response of 6013.

At 6015, the UE is handed over from first access network node 601 to second access network node 602.

At 6016, the 5GC network function 605 sends a service request to the first access network node 601. The service request may comprise the temporary identifier contained in the response of 6013.

At 6017, the first access network node 601 responds to the service request of 6016 with an error message. This is because of the handover of 6015. The error message of 6017 may comprise an indication that the error is that the UE is unknown.

At 6018, the 5GC network function 605 sends an access node discovery request to the AMF 603. The access node discovery request may comprise the combination of identifiers acting as a subscriber's permanent identifier (i.e. that cached at the 5GC network function).

At 6019, the AMF 603 responds to the discovery request of 6018. This response may comprise an identifier of the second access network node, an identifier of the set of access network functions including the second access network node 602 and a temporary identifier for the user equipment identifying the UE in the second access network node 602. This response may comprise a connection state of the user equipment.

At 6020, the 5GC network function 605 sends a discovery request to the NRF 604 for discovering an access network node serving the user equipment. This discovery request may comprise the identifier of the second access network node or the set identifier received in 6021.

At 6021, the NRF 604 responds to the discovery request of 6020. This response may comprise profile information for the set of access network nodes identified by the set identifier received in 6021, including profile information for the second access network node 602.

At 6022, the 5GC network function 605 may cache the profile information received in 6021 with the temporary user equipment identifier and the permanent identifier used in the core network.

At 6023, the 5GC network function 605 sends a service request for the user equipment to the second access network node. This service request may comprise the temporary user equipment identifier.

FIG. 7 shows another example in which a gNb caches information about IDLE UEs and UEs that have been (recently) handed over to other gNBs.

FIG. 7 illustrates signaling between a first access network node 701, a second access network node 702, an AMF 703, an NRF 704 and a 5GC network function 705

At 7001, the AMF 703 has a stored UE context for a UE.

At 7002, the 5GC network function sends an access node discovery request to the AMF 704. The access node discovery request may comprise a permanent subscriber identifier for the UE used by the 5GC (e.g. SUPI/PEI).

At 7003, the AMF 703 responds to the request of 7002. The response may comprise an identifier of the first access network node and/or an identifier of a set of access network nodes to which the first access network node 701 belongs (e.g. a gNB set ID). This set may be as described above in relation to FIG. 6. The response may comprise a temporary identifier of the UE used by the first access network node 701 (e.g. a UE NGAP ID). The response may comprise an indication of a current connection state of the UE (e.g. that the UE is currently in a CONNECTED state).

At 7004, the 5GC network function 705 sends a discovery request to the NRF 704. The discovery request of 7004 may comprise the identifier of the first access network node and/or the set identifier of the first access network node 701 comprised in the response of 7003.

At 7005, the NRF 704 responds to the discovery request of 7004. This response may comprise profile information for a set of access nodes indicated by the set identifier of the first access network node 701. In other words, the response may comprise profile information of a plurality of access network nodes.

At 7006, the 5GC network function 705 sends a service request to the first access network node 701. The service request may comprise the temporary identifier received in 7003.

At 7007, the 5GC network function 705 caches an identity for the first access network node 701 and the identifier of the UE used by the first access network node 701 received in 7003. These identities may be cached with the permanent subscriber identifier (e.g. SUPI/PEI).

Steps 7008 to 7014 illustrate potential signalling that may be performed when the UE enters an IDLE state.

At 7008, the UE enters an IDLE state, and the N2 association between the AMF 703 and the first access network node 701 is released.

At 7009, the 5GC network function 705 sends a service request to the first access network node 701. The service request may comprise the temporary identifier received in 7003.

At 7010, the first access network node 701 responds to the request of 7009 with an error message. The error message may indicate that the UE is in an IDLE state.

At 7011, the 5GC network function 705 sends a request to the AMF 703 to enable the reachability of the UE. For example, this request may comprise a permanent identifier for the UE used by the 5GC (e.g. SUPI/PEI).

At 7012, the UE is paged. In response to this paging, the UE enters a CONNECTED state and an N2 association between the first access network node 701 and the AMF 703 is established.

At 7013, the AMF 703 responds to the request of 7011 to indicate to the 5GC network function 705 that the UE is in a CONNECTED state.

At 7014, the 5GC network function 705 sends a service request to the first access network node 701. The service request may comprise the identifier of the UE used by the first access network node 701 received in 7003.

Steps 7015 to 7019 illustrate signalling that may be performed after handover of a UE from the first access network node 701 to the second access network node 702.

At 7015, the UE is handed over from the first access network node 701 to the second access network node 702.

At 7016 the 5GC network function 705 sends a service request to the first access network node 701. The service request may comprise the identifier of the UE used by the first access network node 701 received in 7003.

At 7017, the first access network node 701 responds to the request of 7016 with an error message. The error message may indicate that the UE has been handed over to another access network node. The error message may comprise an identifier of the access network node to which the UE has been handed over (i.e. the second access network node 702).

At 7018, the 5GC network function 705 caches an identity for the second access network node 702 and the identifier of the UE used by the first access network node 701 received in 7003. These identities may be stored/cached with the permanent subscriber identifier used by the 5GC (e.g. with SUPI/PEI).

At 7019, the 5GC network function 705 sends a service request to the second access network node 702. The service request may comprise the identifier of the UE used by the first access network node 701 received in 7003.

FIG. 8 shows example signaling between different network elements in which a 5GC network function subscribes to learn about changes in the access network node serving a UE, and/or to changes in a temporary access network UE identity, and/or to UE connection state changes.

FIG. 8 illustrates signalling that may be performed between a first access network node 801, a second access network node 802, an AMF 803, an NRF 804 and a 5GC network function 805.

At 8001, the AMF 803 has a UE context stored.

At 8002, the 5GC network function 805 sends a discovery request to the AMF 803 for discovering at least one access network node. The discovery request may comprise a permanent subscriber identifier used by the 5GC (e.g. SUPI/PEI). The discovery request may comprise a Subscription request identifying those changes to which the 5GC network function 805 wants to be alerted to. In the present case, the subscription request subscribes to be alerted to changes in a UE state, changes in access network nodes (i.e. to handovers).

At 8003, the AMF 803 responds to the discovery request of 8002. The response may comprise an identifier of the first access network node 801 and/or an identifier of a set of access network nodes to which the first access network node 801 belongs (e.g. a gNB set ID). The response may comprise an identifier of the UE used by the first access network node 801 (e.g. a UE NGAP ID). The response may comprise an indication of a current connection state of the UE (e.g. that the UE is currently in a CONNECTED state).

At 8004, the 5GC network function 805 sends a discovery request to the NRF 804. The discovery request of 8004 may comprise the identifier of the first access network node 801 and/or the set identifier of the first access network node 801 comprised in the response of 8003.

At 8005, the NRF 804 responds to the discovery request of 8004. This response may comprise profile information for a set of access nodes indicated by the set identifier of the first access network node 801. In other words, the response may comprise profile information of a plurality of access network nodes.

At 8006, the 5GC network function 805 sends a service request to the first access network node 801. The service request may comprise the identifier of the UE used by the first access network node 801 received in 8003.

At 8007, the 5GC network function 805 caches an identity for the first access network node 801 and the identifier of the UE used by the first access network node 801 received in 8003. These identities may be stored/cached with the permanent subscriber identifier for the UE used by the 5GC (e.g. with SUPT/PEI).

Steps 8008 to 8014 illustrate potential signalling that may be performed when the UE enters an IDLE state.

At 8008, the UE enters an IDLE state, and the N2 association between the AMF 803 and the first access network node 801 is released.

At 8009, the AMF 803 sends a notification to the 5GC network function 805 informing the 5GC network function 805 that the UE has entered an IDLE state. This notification may comprise the permanent subscriber identifier used by the 5GC for the UE (e.g. SUPI/PEI).

At 8010, the 5GC network function 805 sends a request to the AMF 803 to request that the UE be made reachable.

At 8011, the UE is paged. The UE enters a CONNECTED state, and an N2 association is established between the first access network node 801 and the AMF 803.

At 8012, the AMF 803 responds to the request of 8010 indicating that the attempt to make the UE reachable is a success. The response may also include an identifier of the first access network node 801, and the identifier for the UE used by the first access network node 801.

At 8013, the 5GC network function 805 sends a service request to the first access network node 801. The service may comprise the identifier for the UE used by the first access network node 801.

Steps 8014 to 8017 illustrate signalling that may be performed after handover of a UE from the first access network node 801 to the second access network node 802.

At 8014, the UE is handed over from the first access network node 801 to the second access network node 802.

At 8015, the AMF 803 sends a notification to the 5GC network function 805 informing the 5GC network function 805 that the UE has been handed over from the first access network node 801 to the second access network node 802. The notification may comprise the permanent subscriber identifier used by the 5GC for the UE (e.g. the SUPT/PEI). The notification may comprise an identifier for the second access network node 802.

At 8016, the 5GC network function 805 caches the identifier for the second access network node 802 and the identifier for the UE used by the first access network node 801.

At 8017, the 5GC network function 805 sends a service request to the second access network node 802. The service may comprise the identifier for the UE used by the first access network node 801.

Figure 11:
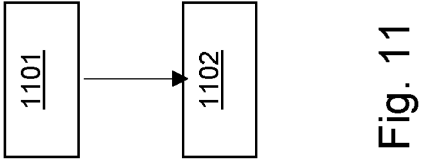
FIGS. 9 to 11 are flow diagrams illustrating potential operations performed by various entities described herein.
Figure 10:
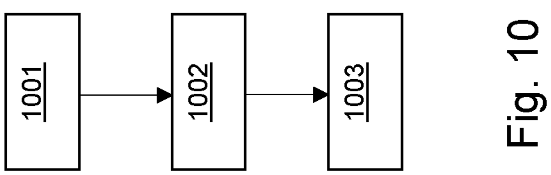
Figure 9:
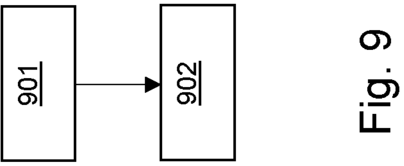

FIGS. 9 to 11 illustrate flow diagrams showing potential operations performed by different network entities described herein.

FIG. 9 illustrates potential actions that may be performed by a network apparatus. The network apparatus may correspond to an AMF. Actions described above in relation to the AMF may also apply in respect of the presently described network apparatus.

At 901, the network apparatus receives from a core network function a request to discover at least one access network node serving a user equipment, the request comprising a first user equipment identifier for identifying the user equipment in a core network.

The first user equipment identifier may comprise at least one of a permanent equipment identifier and a permanent subscriber identity.

At 902, the network apparatus uses the user equipment identifier to provide to the core network function a second user equipment identifier identifying the user equipment in the access network, and at least one access network node identifier identifying at least one access network node in the access network that serves the user equipment. As part of this provision, the network apparatus may provide an indication that the user equipment is in a connected state.

The at least one access network node identifier identifying the at least one access network node in the access network that serves the user equipment may be at least one of: a node identifier identifying a respective access network node; and a set identifier identifying a respective plurality of access network nodes. For example, the at least one access node identifier may be a single node identifier identifying a single respective access network node. The at least one access node identifier may be a plurality of node identifiers, each node identifier identifying a single (and respective) access network node. The at least one access node identifier may be a set node identifier that identifies a set/group of access network nodes. The at least one access node identifier may be a plurality of set node identifiers, each set node identifier identifying a respective set/group of access network nodes.

The network apparatus may receive from the core network function a subscription request subscribing to changes in at least one of: a connection state of the user equipment; the at least one access network node identifier for identifying at least one access network node in the access network that serves the user equipment; and the second user equipment identifier identifying the user equipment. The subscription request may be comprised within request to discover at least one access network node serving a user equipment.

The network apparatus may receive an indication that there has been a change in at least one of: a connection state of the user equipment; the at least one access network node identifier for identifying at least one access network node in the access network that serves the user equipment; and the second user equipment identifier identifying the user equipment. The network apparatus may, after receiving said indication that there has been a change, signal the core network function information about said change.

The network apparatus may receive, from the core network function, a request for the user equipment to be transitioned from an idle state to a connected state. In response to receiving this request, the network apparatus may send a request to the user equipment to transition from an idle state to a connected state. The network apparatus may receive an indication from the access network node that the transition has been made successfully. In response to receiving this indication of a successful transition, the network apparatus may send said core network function an indication that the user equipment is in a connected state.

The network apparatus may determine at least one access network node that will be assigned to the user equipment when the user equipment transitions to the connected state. In such a case, said indication that the user equipment is in a connected state comprises at least one access network node identifier identifying the at least one assigned access network node. As per the above, the identifier identifying the at least one assigned access network node may be in the form of an identifier of a single access network node, or an identifier of a group of access network nodes (e.g. a set identifier). For example, the at least one access node identifier may be a single node identifier identifying a single respective access network node. The at least one access node identifier may be a plurality of node identifiers, each node identifier identifying a single (and respective) access network node. The at least one access node identifier may be a set node identifier that identifies a set/group of access network nodes. The at least one access node identifier may be a plurality of set node identifiers, each set node identifier identifying a respective set/group of access network nodes.

FIG. 10 is a flow chart illustrating potential operations that may be performed by a core network apparatus. The core network apparatus may interact with the network apparatus described above in relation to FIG. 9 (e.g. with an AMF as described). References in the following to a network apparatus is understood to correspond to the network apparatus of FIG. 9.

At 1001, the core network apparatus transmits to a network apparatus a request to discover at least one access network node serving a user equipment, the request comprising a first user equipment identifier for identifying a user equipment in a core network.

At 1002, the core network apparatus receives from the network apparatus a second user equipment identifier identifying the user equipment in the access network, and at least one access network node identifier identifying at least one access network node in the access network that serves the user equipment. The connection state of the user equipment (e.g. connected state) may also be included in this communication from the network apparatus to the core network apparatus.

The at least one access network node identifier identifying the at least one access network node in the access network that serves the user equipment may be at least one of: a node identifier identifying a respective access network node; and a set identifier identifying a respective plurality of access network nodes. For example, the at least one access node identifier may be a single node identifier identifying a single respective access network node. The at least one access node identifier may be a plurality of node identifiers, each node identifier identifying a single (and respective) access network node. The at least one access node identifier may be a set node identifier that identifies a set/group of access network nodes. The at least one access node identifier may be a plurality of set node identifiers, each set node identifier identifying a respective set/group of access network nodes.

At 1003, the core network apparatus uses the received second user equipment identifier and the at least one access network node identifier to send a first service request for the user equipment to at least one of said identified at least one access network nodes.

The core network apparatus may send a subscription request subscribing to changes in at least one of: a connection state of the user equipment; the at least one access network node identifier for identifying at least one access network node in the access network that serves the user equipment; and the second user equipment identifier identifying the user equipment.

The subscription request may be comprised within the request to discover at least one access network node serving a user equipment.

The core network apparatus may receive from the network apparatus a notification of a change in at least one of: a connection state of the user equipment; the at least one access network node identifier for identifying at least one access network node in the access network that serves the user equipment; and the second user equipment identifier identifying the user equipment.

The first user equipment identifier may comprise at least one of a permanent equipment identifier and a permanent subscriber identity.

The core network apparatus may receive an indication that the user equipment is in an idle connection state, or is not served or known by said identified at least one access network node to which the first service request is transmitted. The core network apparatus may determine to send a second service request to said user equipment. In response to receiving said indication and said determination, the core network apparatus may send a request for the user equipment to transition to a connected state. In response to said request for the user equipment to transition, the core network apparatus may receive an indication that the user equipment is in a connected state, and receive a new identifier of an access network node currently serving the user equipment. The core network apparatus may send the second service request for the user equipment to the access network node identified by the new identifier on receipt of this indication.

The core network apparatus may receive an indication that the user equipment is not served or known by said identified at least one access network node to which the first service request is transmitted. The core network apparatus may determine to send a third service request to said user equipment. In response to receiving said indication and said determination, the core network apparatus may send a new request to the network apparatus to discover at least one access network node serving the user equipment. The core network apparatus may receive a new identifier of an access network node currently serving the user equipment in response to the new request. In response to receiving the new identifier, the core network apparatus may send the third service request for the user equipment to the access network node identified by the new identifier.

The core network apparatus may receive an indication that the user equipment has been handed over from a first access network node to a second access network node. The core network apparatus may determine to send a fourth service request to said user equipment. In response to receiving said indication and said determination, the core network apparatus may send the fourth service request for the UE to the second access network node. The indication that the user equipment has been handed over may comprise an identifier for the second access network node.

The core network apparatus may transmit a request to the network apparatus for an identifier of the second access network node or an identifier of a set of access nodes that comprises the second access network node. The core network apparatus may receive the identifier of the second access network node or the identifier of said set in response to the request for the identifier of the second access network node.

FIG. 11 illustrates potential operations that may be formed by an access network node. The access network node may interact with each of the apparatuses described above in relation to FIGS. 9 and 10.

At 1101, the access network node receives from a core network apparatus a service request comprising a first user equipment identifier identifying a user equipment in an access network associated with said access network node.

At 1102, the access network node rejects the service request when the user equipment is not known and/or is no longer serviced by the access network node. To reject the request, the access network node may signal a rejection to the core network apparatus. As an alternative, the access network node may simply fail to respond within a predetermined time period. The core network node may respond to the lack of message within the predetermined time period and/or the explicitly signalled rejection by contacting a new access network node for accessing the user equipment, as indicated/described above.

The access network node may respond to the service request with an indication that the user equipment is currently being served by a different access network node, said indication identifying the different access network node. This indication may be comprised within a rejection message sent as part of 1102.

The presently described mechanisms may be advantageous in that they allow for the introduction of access network node services consumed by core network functions when the UE is in a transition phase in which only some direct communication is enabled and the AMF knows the access network node from other interactions.

Figure 2:
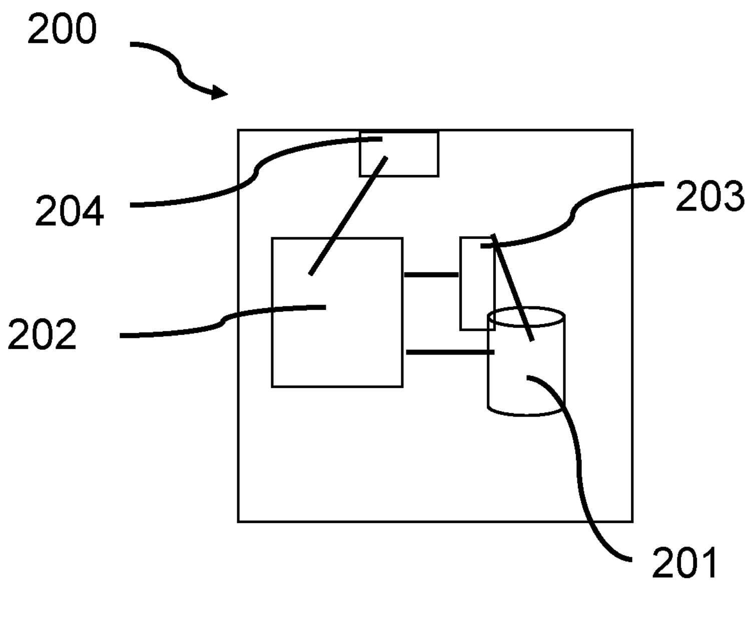
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
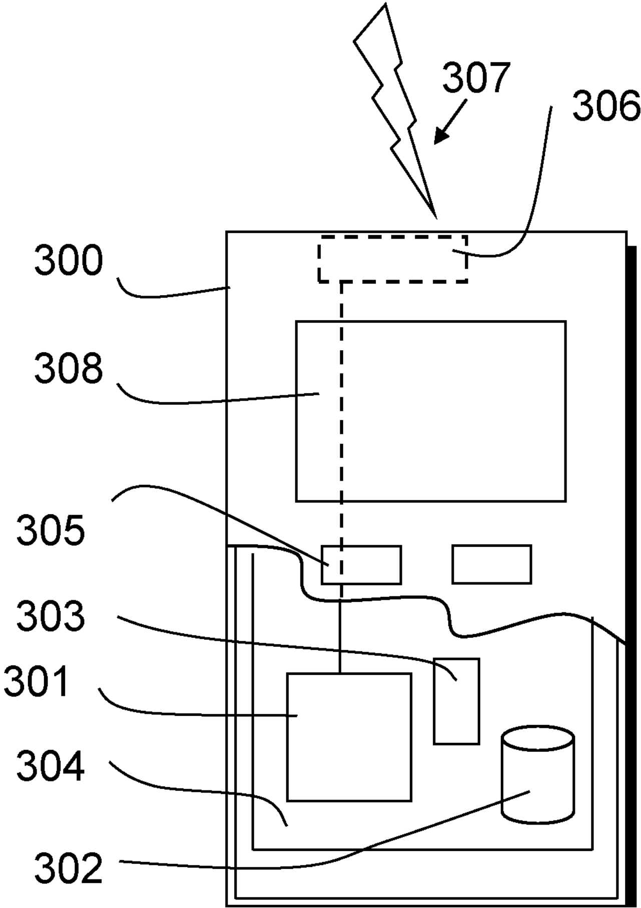
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
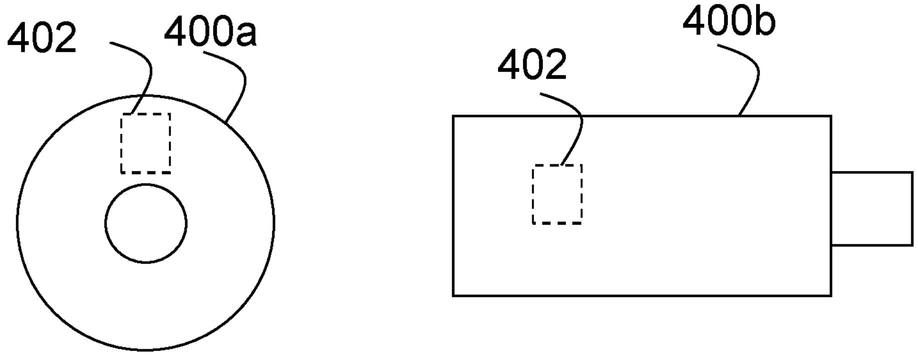
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of any of FIGS. 9 to 11.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in any of FIGS. 9 to 11, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor;

at least one memory storing instructions that, when executed by the at least one processor, cause the apparatus at least to perform:

transmitting to a network apparatus of an access network a request to discover at least one access network node serving a user equipment, the request comprising a first user equipment identifier for identifying the user equipment in a core network;

receiving from the network apparatus a second user equipment identifier identifying the user equipment in the access network, and at least one access network node identifier identifying at least one access network node in the access network that serves the user equipment;

using the second user equipment identifier and the at least one access network node identifier that were received to send a first service request for the user equipment to at least one of the at least one access network node;

receiving an indication that the user equipment is not served or known by the at least one of the at least one access network node to which the first service request is transmitted;

determining to send a third service request to the user equipment, sending, in response to the receiving the indication and the determining, a request to the network apparatus to discover at least one access network node serving the user equipment;

receiving a new identifier of an access network node currently serving the user equipment; and sending, in response to the receiving the new identifier, the third service request for the user equipment to the access network node identified by the new identifier.

2. An apparatus as claimed in claim 1, wherein the instructions are further configured to, when executed by the at least one processor, perform sending a subscription request subscribing to changes in at least one of:

a connection state of the user equipment;

the at least one access network node identifier for identifying the at least one access network node in the access network that serves the user equipment; or the second user equipment identifier identifying the user equipment.

3. An apparatus as claimed in claim 1, wherein the instructions are further configured to, when executed by the at least one processor, perform:

receiving an indication that the user equipment has been handed over from a first access network node to a second access network node, the indication that the user equipment has been handed over comprising an identifier for the second access network node or an identifier of a set of access nodes that comprises the second access network node; and determining to send a fourth service request to the user equipment, sending, in response to the receiving the indication and the determining, a fourth service request for the user equipment to the second access network node.

4. An apparatus as claimed in claim 1, wherein the at least one access network node identifier identifying the at least one access network node in the access network that serves the user equipment is at least one of:

a node identifier identifying a respective access network node of the at least one access node; or a set identifier identifying a respective plurality of access network nodes of the at least one access node.

* * * * *